United States Patent [19]

McPhee et al.

[11] 4,240,782
[45] Dec. 23, 1980

[54] EXTRUDER HEAD FOR MAKING ELASTOMER-FIBER COMPOSITE HOSE

[75] Inventors: Donald J. McPhee, Salt Lake City, Utah; Herbert W. Gray, Littleton, Colo.

[73] Assignee: The Gates Rubber Company, Denver, Colo.

[21] Appl. No.: 85,656

[22] Filed: Oct. 17, 1979

[51] Int. Cl.³ .................. B29D 7/04; B29D 23/05
[52] U.S. Cl. ........................ 425/467; 264/108; 264/209; 425/380
[58] Field of Search ............. 425/467, 461, 380; 264/108, 209; 138/125, 126, 172, 174

[56] References Cited

U.S. PATENT DOCUMENTS

| 4,044,799 | 8/1977 | Higbee et al. | 138/125 |
| 4,056,591 | 11/1977 | Goettler et al. | 264/108 |
| 4,057,610 | 11/1977 | Goettler et al. | 264/108 |

Primary Examiner—Jeffery R. Thurlow
Attorney, Agent, or Firm—H. W. Oberg, Jr.; Raymond Fink; Curtis H. Castleman, Jr.

[57] ABSTRACT

An extruder head that includes a doubled taper conical pin with a divergent conical surface interconnected at a common base to a convergent conical surface; and a coaxial die with an interior cavity spaced from and having substantially the same contour as the pin, the die and pin together forming an annular gap with an annular inlet area, the gap conically divergent to a second annular area juxtaposed the common conical base of the pin to form a second annular area of at least twice the size of the inlet area, the gap conically convergent from the second annular area to an annular exit area.

7 Claims, 2 Drawing Figures

EXTRUDER HEAD FOR MAKING ELASTOMER-FIBER COMPOSITE HOSE

BACKGROUND OF THE INVENTION

The invention relates to an extruder head for orienting fibers in the sidewall of an elastomer-fiber composite hose or tubular conduit, but more particularly, the invention relates to an extruder head with a pin and die configuration which permits extruding hose at both large and small internal diameters (e.g., from about 2½ inches down to about ¼ inch) while orienting fibers in the hose sidewall for satisfactory burst characteristics.

Elastomeric hose may be formed with an extruder head that has a convergently tapered pin from head inlet to head outlet and a coaxial die that is also convergently tapered from head inlet to outlet. Together the pin and die define a conically convergent annular gap through which an elastomer is expelled to form a hose or conduit. Some pin and die configurations may also include a cylindrical extension of the pin and die to form what is known as a "land." An example of a conically tapered pin and die without a land appears in U.S. Pat. No. 4,044,799.

A divergently tapered pin and correspondingly coaxial divergent die with a land is known to desirably orient fibers of an elastomer-fiber composite stock generally longitudinally and circumferentially when the exit formed by the annular gap between the pin and die is two, and preferably at least three times greater than the extrusion head entry area formed by the annular gap between the pin and die. An example of a "divergent" pin and die arrangement for extruding elastomer-fiber composite tubing is disclosed by U.S. Pat. No. 4,056,591. A process for extrusion of hose through such dies is disclosed in U.S. Pat. No. 4,056,591. While such extrusion heads with a divergent pin and die arrangement are suitable for extruding elastomer-fiber composites to form a hose with oriented fibers for desirable burst characteristics, the size range of hose which can be produced with the head is particularly limited (e.g., internal diameters, I.D., between about 0.65 inches and about 1.0 inch). The size restrictions occur because of the area ratio limitations from inlet to exit required for selective fiber orientation. The restriction is particularly evident when the annular gap exit is at the preferred ratio of at least 3 times the annular gap inlet area. The pin diameter becomes so small at internal diameters below 0.65 inch that the pin will not either support itself or withstand the extruding pressures. For example, assuming a 0.15 wall gauge hose and an expansion area ratio from extrusion head inlet to extrusion head outlet of 3, the minimum prior art pin diameter at entry for a 0.625 inch I.D. would be 0.097 inches. For the same expansion ratio and wall gauge, a 0.375 I.D. hose would require a minimum pin die diameter of 0.025 inches; obviously, the pin could not support itself with such a minimum amount of material. When the hose internal diameter is reduced to 0.25 inches, which is a common size such as used for fuel line hoses, the pin diameter becomes negative and therefore impossible to make.

At the larger hose diameters, (e.g., 2.55 inch) the pin size may not have sufficient cross-section to withstand extruding pressures, (e.g., extruding pressures of 2800 psi).

SUMMARY OF THE INVENTION

In accordance with the invention, an extruder head with a coaxial pin and die is provided which permits extruding hose in a range from below ¼ inch I.D. up to 2¼–3 inches I.D. while orienting fibers of an elastomer-fiber composite in the hose sidewall so as to achieve a satisfactory burst strength. A double cone pin is used which has a contour which diverges from an entry end and then converges to an exit end. The rate of pin divergence (e.g., conical angle) is greater than the rate of pin convergence (cone angle). A die is arranged coaxial with the pin and has an internal contour which is substantially the same as but spaced from that of the pin. Together, the pin and die form an annular gap where the area at the maximum divergence is at least two but preferably at least three times that annular gap formed at the inlet end.

An object of the invention is to provide an extrusion head with a pin and die arrangement where the pin has sufficient cross-section at its minimum diameter to sufficiently support itself when extruding small diameter hose (e.g., internal diameters less than about 0.625 inch and more preferably, about 0.25 inch).

Another object of the invention is to provide an extrusion head for forming elastomer-fiber tubular conduits of one inch or less internal diameter where there is a high degree of fiber orientation in the conduit wall so as to provide desirable burst characteristics for the conduit.

The primary advantage of the invention is that elastomer-fiber composite tubing can be produced with internal diameters of 0.5 inches and less with a high degree of fiber reorientation necessary for hose burst requirements.

These and other objects of the invention will be apparent by reviewing the drawings and description thereof wherein.

DESCRIPTION OF PREFERRED EMBODIMENT

Figure 1:
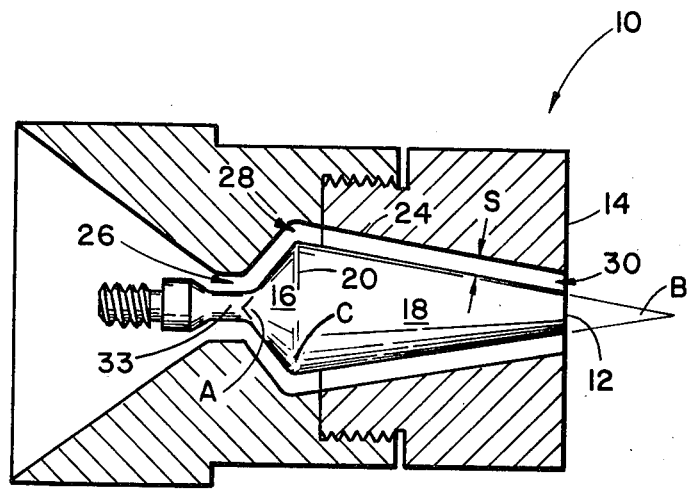
FIG. 1 is an axial view showing the extruder head of the invention with the die in axial cross section.
Figure 2:
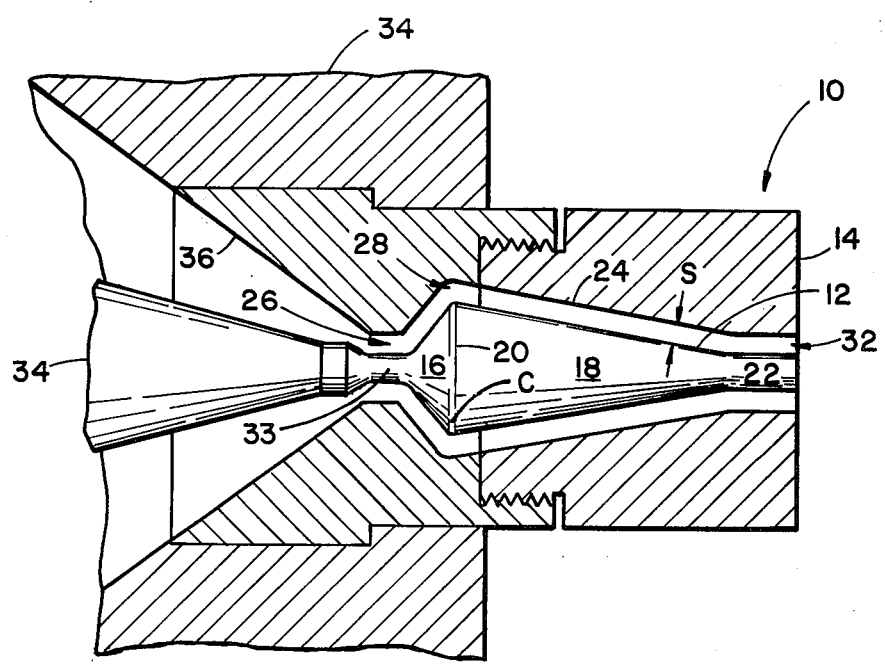
FIG. 2 is a view similar to FIG. 1 showing an alternate form of the invention attached to the outlet of an extruder.

Referring to the drawings, an extrusion head 10 is provided which includes a double cone pin 12 and a coaxial die 14. The pin has first 16 and second 18 frustro-conical surfaces that are interconnected at a common base with each other through an interconnecting blending surface 20. The first frustro-conical surface forms the divergent extrusion entry portion of the pin and has a conical angle A from about 90 degrees to about 130 and more preferably about 100 degrees to about 110 degrees. The interconnected second conical surface 18 converges from the interconnecting surface 20 at a conical angle B from about 5 degrees to about 25 degrees and more preferably from about 10 degrees to about 20 degrees. Optionally, the pin may further extend into a substantially cylindrical surface 22 to define a land as shown in FIG. 2. In any case, the angle C between the conical surfaces should be no greater than about 120 degrees for adequate fiber orientation.

The coaxially arranged die has an internal contour 24 which substantially follows the profile of the pin. Preferably, but not essentially, the internal contour of the die is at a constant spacing S from the pin. Together, the pin and die define an annular gap which diverges from an annular gap that defines the inlet area 26, to a larger annular gap that defines the maximum expansion area 28 juxtaposed the blending surface 20 which is at least two, and preferably at least three times the annular inlet area 26. The annular gap converges from the expansion area down to an exit annular area which may be at the end of the taper of the pin 30 or at the end of an interconnected cylindrical portion of the pin 32. The exit area is always less than the expansion area, and preferably, no greater than about 0.8 of the expansion area. The die may be formed of two or more pieces to facilitate fabrication and cleaning. The double cone pin configuration allows a pin construction at the inlet end with a support pin 33 of sufficient diameter or cross section. Table I lists several pin configurations for forming hose with internal diameters ranging from 0.25 inches to 2.5 inches.

TABLE I

| Hose internal diameter, in. | .25 | .375 | .625 | 2.5 |
|---|---|---|---|---|
| Support pin diameter, in. (33) | .200 | .250 | .274 | .85 |
| Gap width, in. (S) | .129 | .121 | .164 | .210 |
| Inlet area, in$^2$ | .133 | .153 | .225 | .699 |
| Expansion area, in.$^2$ | .439 | .505 | .726 | 2.217 |
| Exit area in. | .146 | .178 | .505 | .820 |
| Expansion area/inlet Area Ratio | 3.3 | 3.3 | 3.3 | 3.2 |
| Expansion area/exit Area ratio | 3.00 | 2.84 | 1.79 | 1.22 |
| Exit area/inlet area ratio | 1.10 | 1.63 | 2.24 | 1.17 |
| Cone angle, diverging, degrees (A) | 100 | 100 | 105 | 110 |
| Cone angle, converging, degrees (A) | 20 | 20 | 15 | 10 |

As easily seen in the Table, the support pin diameter is sufficiently large to support the first and second frustroconical surfaces of the pin. Another characteristic which should be emphasized in Table I is that while the ratio of expansion to inlet area is generally 3.3, the ratio of exit area to inlet area is as low as 1.1. Also, the ratio of expansion area to exit area (the amount of convergence) may be very close to the original expansion area ratios (the amount of divergence). While it might be suspected that fibers of an elastomeric-fiber composite might be oriented back to their original laminar flow condition because of the similarity of ratios (expansion area/inlet area and expansion area/exit area) this is not the case. Hoses formed by the pin and die exhibited satisfactory burst pressures. To illustrate, several hoses were built using the pin and die configurations of Table I. A vulcanizable elastomer was formulated with cellulose fiber at a 8.5 percent volume fraction. After extrusion, the hoses were cured using the open steam curing technique. The burst pressures for the hoses indicate satisfactory longitudinal and circumferential fiber orientation and were as follows: 0.25 in. I.D., 215 psi; 0.370 in. I.D., 165 psi; 0.650 in. I.D., 130 psi; 2.55 in. I.D., 65 psi. The different elastomers and fibers which may be used need not here be discussed in detail as they are well exemplified by the prior art such as U.S. Pat. Nos. 3,697,364 and 3,709,845.

A given extruder 34 will have a fixed diameter exit for attachment of the extrusion head. An inlet portion of the die may be shaped (e.g., a convergent cone 36) to direct the elastomer-fiber composite stock to the inlet area of the pin and die.

The foregoing description is made for purpose of illustration only and is not intended to limit the scope of the invention which is to be determined by the appended claims.

What is claimed is:

1. An extruder head for extruding an elastomer-fiber composite into a tubular conduit having disarranged fibers, the extruder head of the type having a coaxial pin with a support pin portion and die which together define a first annular gap with an annular inlet area between the support pin portion and die, the first annular gap conically diverging to a second annular area of at least twice the size of the inlet area wherein the improvement comprises:

coaxial extensions of the pin and die to define a second annular gap that conically converges from the second annular area to a smaller third annular gap that defines a third annular area, the first annular gap divergence rate being greater than the second annular gap convergence rate and wherein the pin and die may be selectively sized to extrude tubular conduit having an internal diameter from below 0.25 inch to about 3.0 inch with the supporting pin portion having sufficient cross section for supporting the pin.

2. The extruder head as claimed in claim 1 wherein the first annular gap diverges at an angle from about 50 degrees to about 60 degrees, and the second annular gap converges at an angle from about 5 degrees to about 25 degrees.

3. The extruder head as claimed in claim 1 wherein the second annular area is at least about three times the annular inlet area.

4. The extruder head as claimed in claim 1 wherein there is an included angle between the first and second annular gaps that is no greater than about 120 degrees.

5. The extruder head as claimed in claim 1 and further including second coaxial extensions of the pin and die to define a cylindrical gap that extends from the third annular area to an exit area.

6. An extruder head comprising:

a double cone pin with a support pin portion and first and second frustro-conical surfaces interconnecting at a common base with a blending surface between the conical surfaces and wherein the first conical surface has a conical angle from about 90 degrees to about 130 degrees, and the second conical surface has a conical angle from about 5 degrees to about 25 degrees; and a die with first and second axial openings and an intermediate cavity having an internal contour that is spaced from and substantially follows the contour of the pin, the first die opening and pin at the support pin portion forming an annular gap inlet area, the blending surface and die forming an annular gap and annular expansion area that is at least about three times the inlet area, and the pin and die forming an annular exit area that is less than the expansion area and wherein the pin and die may be selectively sized to extrude tubular conduit having an internal diameter from below 0.25 inch to about 3.0 inch with the support pin portion having sufficient cross section to support the pin.

7. The extruder head as claimed in claim 6 wherein the exit area is no greater than about 0.8 of the second area.

* * * * *